(12) United States Patent
Martino et al.

(10) Patent No.: US 7,862,329 B2
(45) Date of Patent: Jan. 4, 2011

(54) EASILY REMOVABLE VALVE PIN BUSHING

(75) Inventors: Filippo Martino, Mississauga (CA); Salvatore Armocida, Rexdale (CA)

(73) Assignee: Stacktech Systems, Ltd. (CA)

( * ) Notice: Subject to any disclaimer, the term of this patent is extended or adjusted under 35 U.S.C. 154(b) by 681 days.

(21) Appl. No.: 11/729,438

(22) Filed: Mar. 28, 2007

(65) Prior Publication Data
US 2007/0237852 A1    Oct. 11, 2007

(30) Foreign Application Priority Data
Apr. 11, 2006   (CA) ................................. 2542587

(51) Int. Cl.
B29C 45/23    (2006.01)
(52) U.S. Cl. .................. 425/564; 425/566; 425/572
(58) Field of Classification Search ................ 425/542, 425/543, 562–569, 571; 264/328.1
See application file for complete search history.

(56) References Cited

U.S. PATENT DOCUMENTS

| 4,682,945 | A  | * | 7/1987  | Schad ......................... 425/549 |
| 5,141,696 | A  | * | 8/1992  | Osuna-Diaz .............. 264/297.2 |
| 5,378,138 | A  | * | 1/1995  | Onuma et al. ............... 425/549 |
| 5,894,025 | A  | * | 4/1999  | Lee et al. .................... 425/562 |
| 6,379,144 | B1 | * | 4/2002  | Wright ........................ 425/562 |
| 6,386,508 | B1 | * | 5/2002  | Steil et al. ..................... 251/31 |
| 6,419,870 | B1 | * | 7/2002  | Lee et al. ................. 264/328.1 |
| 6,514,440 | B1 | * | 2/2003  | Kazmer et al. ................. 264/39 |
| 6,599,116 | B2 | * | 7/2003  | Lee et al. ..................... 425/564 |
| 6,739,863 | B2 | * | 5/2004  | Olaru .......................... 425/564 |
| 6,769,896 | B2 | * | 8/2004  | Kazmer et al. ............... 425/145 |
| 6,824,379 | B2 | * | 11/2004 | Doyle et al. ................. 425/564 |
| 6,840,758 | B2 | * | 1/2005  | Babin et al. ................. 425/564 |
| 7,217,384 | B2 | * | 5/2007  | Tanaka et al. ............. 264/328.8 |
| RE40,478  | E  | * | 9/2008  | Olaru .......................... 425/564 |
| 7,419,625 | B2 | * | 9/2008  | Vasapoli et al. ............. 264/40.1 |
| 7,581,944 | B2 | * | 9/2009  | Fairy et al. .................... 425/564 |
| 2001/0011415 | A1 | * | 8/2001  | Kalemba ...................... 29/611 |
| 2003/0086996 | A1 | * | 5/2003  | Babin et al. ................. 425/547 |
| 2004/0265421 | A1 | * | 12/2004 | Olaru .......................... 425/564 |
| 2006/0153945 | A1 | * | 7/2006  | Blais et al. ................... 425/568 |
| 2008/0093773 | A1 | * | 4/2008  | Schwarzkopf .......... 264/328.11 |

FOREIGN PATENT DOCUMENTS

JP    05200788 A  *  8/1993

* cited by examiner

*Primary Examiner*—Philip C Tucker
*Assistant Examiner*—Dimple N Bodawala
(74) *Attorney, Agent, or Firm*—Harness, Dickey & Pierce, P.L.C.

(57) ABSTRACT

The invention provides a replaceable bushing in the base of a nozzle of a hot runner assembly and provides access through a manifold and a rear plate for removal and replacement of the bushing without having to disassemble the hot runner assembly. According to one embodiment of the invention, an actuator access port is provided for removing the valve pin actuator and a bushing access port is provided for accessing the bushing upon removal of the valve pin actuator, both of which may be removed from a second or rear plate of the injection molding assembly.

14 Claims, 1 Drawing Sheet

EASILY REMOVABLE VALVE PIN BUSHING

FIELD OF THE INVENTION

This invention relates generally to injection molding apparatus. More particularly, this invention relates to hot runner arrangements utilizing a valve pin to control melt flow. Still more particularly, this invention relates to a guide bushing for guiding reciprocal movement of the valve pin and replacement of the bushing.

BACKGROUND OF THE INVENTION

Valve gated injection molding apparatus is well known. Such apparatus utilizes a valve pin slidably received in a valve gate to control flow of melt when molding a part, to ensure a positive shut-off of the gate. While this technology has been utilized for decades in view of its positive shut-off attributes, it suffers from leakage problems upstream of the gate.

The valve stem moves slidably within a tight fitting bushing secured to a rear face of a nozzle housing. The nozzle housing provides a melt passage from a manifold to a nozzle tip mounted to the nozzle housing. The nozzle has a cap which tip registers with the gate. The valve pin extends through the bushing, through the melt passage and into a melt opening in the gate. The bushing supports the valve pin for its slidable movement and furthermore provides a seal to prevent melt from flowing out of the nozzle housing along the valve pin.

As one would expect, over a period of time, as the valve pin rubs against the bushing, wear will occur. Eventually the wear will create a significant gap between the valve pin and the bushing enabling melt to leak out between the two components, which may affect movement of the valve pin.

None of the present valve gated systems utilizing a valve pin bushing are maintenance friendly. Accordingly, replacement of the bushing generally requires removal and complete disassembly of the mold. Generally, the bushings are retained within the nozzle housing and accessible only upon removal of the nozzle housing which in turn requires removal of the portions of the mold in which the nozzle housing is mounted. At a minimum, a rear plate of the mold must be removed which in effect amounts to disassembly of the mold whether or not this is done in situ.

It is an object of the present invention to facilitate bushing removal for valve gate maintenance to enable replacement of such wear components without disassembly of the hot runner.

SUMMARY OF THE INVENTION

In very general terms, the invention provides a replaceable bushing in the base of a nozzle of a hot runner assembly and provides access through a manifold and a rear plate for removal and replacement of the bushing without having to disassemble the hot runner assembly. According to one embodiment of the invention, an actuator access port is provided for removing the valve pin actuator and a bushing access port is provided for accessing the bushing upon removal of the valve pin actuator, both of which may be removed from a second or rear plate of the injection molding assembly.

More particularly, a valve gated injection molding assembly is provided which has first and second plates in face to face juxtaposition with the front face of the second plate facing the first plate and defining a manifold cavity therebetween for receiving a melt manifold. A nozzle extends through the first plate and has a base for contacting the manifold and a tip opposite the base. The nozzle has a passage extending therethrough between the base and the tip along which melt can flow from the manifold to the tip. A valve pin is slidably mounted in the passage. The valve pin has a tip end for extending through the nozzle tip to open and close a melt passage through a gate. The valve pin further has an actuator end opposite the tip end. A valve pin guide bushing extends from the base of the nozzle for receiving and guiding the valve pin for movement along the passage. The valve pin guide bushing removably engages the base of the nozzle for removal in a direction away from the base toward the second plate. A valve pin actuator is mounted to the second plate and connected to the valve pin activator end for moving the valve pin along the passage for the opening and closing of the melt outlet. The second plate has an actuator access port for removal of the valve pin actuator from a rear face of the second plate opposite the front face. The second plate further has a bushing access port for removal of the bushing therethrough absent the actuator.

The valve pin bushing may extend through the manifold. Space may be provided between the valve pin bushing and the manifold to allow thermal expansion of the manifold without such thermal expansion exerting pressure on the valve pin bushing.

The actuator may be a piston slidably mounted in a bore in the second plate and slidable along the bore in response to fluid pressure.

A heat insulator (also referred to as a "manifold insulator") may extend between the second plate and the manifold, with the valve pin extending through the insulator.

A retainer may extend about the valve pin between the valve pin and the insulator. The retainer may abut against the valve pin bushing to retain the valve pin bushing against movement away from the nozzle. The retainer may be secured to at least one of the insulator and the manifold. The retainer is removable through the bushing access port.

A gap may be provided between the valve pin and the retainer to allow for movement of the retainer radial to the valve pin without applying pressure to the valve pin.

The retainer may threadedly engage the insulator.

DESCRIPTION OF DRAWINGS

Preferred embodiments of the present invention are described below with reference to the accompanying illustration in which.

DESCRIPTION OF PREFERRED EMBODIMENTS

Figure 1:
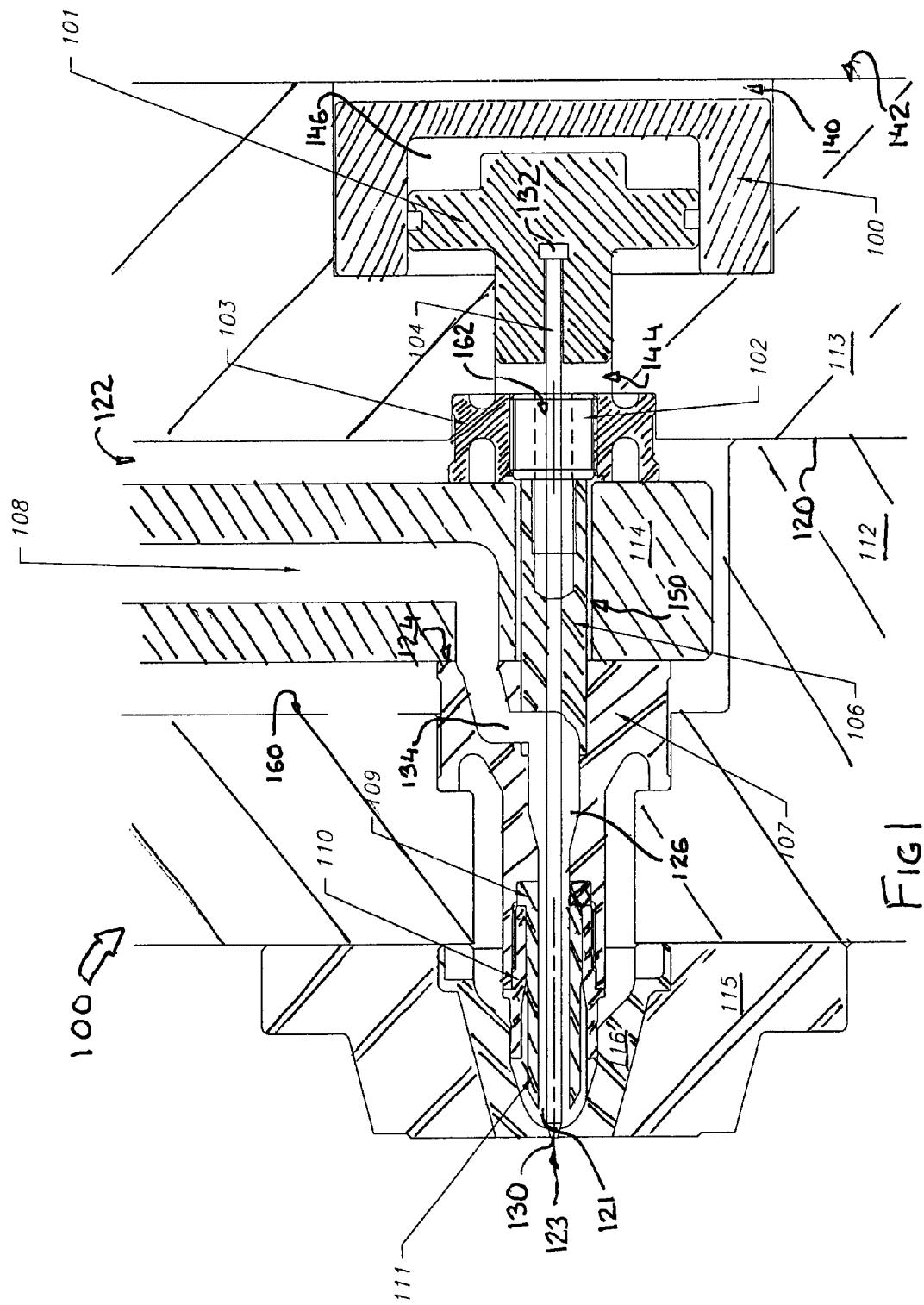
FIG. 1 is a sectional view along a valve pin axis of a valve gated injection molding assembly according to the present invention.

An injection molding assembly is generally indicated by reference 100. It includes a first plate 112 in face to face juxtaposition with a front face 120 of a second plate 113. A manifold cavity 122 is defined between the first plate 112 and 113. The manifold cavity 122 receives a manifold 114 having a melt passage 108 along which melt flows.

A nozzle comprising a nozzle housing 107 and a nozzle tip 111 extends through the first plate 112. The nozzle housing has a base 124 which contacts the manifold 114. The nozzle has a passage 126 extending therethrough between the base 124 and the nozzle tip 111. The passage 126 fluidly communicates with the melt passage 108 to provide a path for melt from the melt passage 108 to the nozzle tip 111. The nozzle tip 111 has a melt outlet 121 which registers with a corresponding outlet or "gate" 123 in a gate insert 116 which forms part of a mold 115. The valve tip 111 is retained in place in the nozzle housing 107 by a valve cap 110 which threadedly engages the nozzle housing 107 and presses against a base flange 109 of the nozzle tip.

A valve pin 104 is slidably mounted in the passage. The valve pin 104 has a tip end 130 for interfacing with the outlet 123 in the gate insert to open and close the gate 123. The valve pin 104 has an actuator end 132 opposite the tip end 130.

A valve pin guide bushing 106 extends from the base 124 of the nozzle housing 107 for receiving and guiding the valve pin 104 for movement along the passage 126. The valve pin guide bushing 106 removably engages the base 124 of the nozzle housing 107 and is removable in a direction away from the base 124 toward the second plate 113 (i.e. to the right as illustrated).

The valve pin guide bushing 106 would generally be a tight sliding fit in the nozzle housing 107 and would typically have a melt passage 134 registering with the melt passage 108 and fully communicating with the passage 126 to provide a conduit for melt from the manifold 114 into the passage 126.

While this is "typical", it is conceivable that the valve pin guide bushing 106 would be shorter than illustrated and wouldn't require a passage therethrough to act as a melt conduit.

A valve pin actuator having a piston 101 is mounted to the second plate 113 and connected to the valve pin connector 132. The piston 101 is mounted within a bore 146 in an insert 100 is secured to the valve pin 104 at the valve pin connector 132. The valve pin actuator is responsive to fluid pressure between the bore 146 and the piston 101 to cause movement of the valve pin 104 along the passage 126 for opening and closing the melt outlet 112.

The second plate 113 has an actuator access port 140 through which the valve pin actuator may be removed from a rear face 142 of the second plate 113 which is opposite the front face 120. In the arrangement illustrated this would require first removing the insert 100. The second plate 113 further has a bushing access port 144 between the actuator access port and the bushing 106. The access port is dimensioned to have a breadth or diameter greater than that of the bushing 106. Accordingly upon removal of the actuator 100, 101, which would typically be accomplished by also withdrawing the valve pin 104, the bushing 106 may be withdrawn through the bushing access port through the second plate. Accordingly, bushing removal may be effected without separating the first and second plates 112 and 113 respectively, removal of the manifold 114 or disassembly of the nozzle assembly 107, 111.

In order to avoid stress being applied to the valve pin 104 as a result of differential thermal expansion of the various components of the injection molding assembly 100 and in particular the manifold 114 relative to the first plate 112 and 113, a space 150 is provided between the manifold 114 and the valve pin bushing 106.

In order to provide adequate clamping force between the manifold 114 and the base 124 of the nozzle housing 107, preferably the manifold 114 is clamped between the first plate 112 and 113. It is however desirable to avoid loss of heat from the manifold 114 as this would in turn cause thickening of melt flowing along the melt passage 108. Accordingly, a heat insulator 103 may be provided which extends between the second plate 113 and the manifold 114. In addition, the nozzle housing 107 generally extends beyond an inside face 160 of the first plate 107 enabling the nozzle housing 107 to contact the manifold 114 without the manifold 114 abutting against the first plate 112. Accordingly, the manifold 114 is clamped between the first plate 112 and 113 by virtue of being pressed between the base 124 of the nozzle housing 107 and the insulator 103.

The valve pin 104 extends through the insulator 103 and a retainer 102, such as the tubular element illustrated may be provided through the insulator 103 to press against the valve pin bushing 106 to prevent its movement toward the second plate in response to melt pressure within the passage 126. The retainer 102 is illustrated as threadedly engaging the insulator 103. Other arrangements may be possible, for example the retainer 102 may simply threadedly engage the second plate 113 without requiring securement to the insulator 103. Other securing arrangements may also be possible such as using screw fasteners to secure the retainer 102 to the insulator 103.

As with the manifold 114, a gap 162 may be provided between the valve pin 104 and the retainer 102 to allow for movement of the retainer radial to the valve pin 104 without applying pressure to the valve pin 104.

Although a piston and cylinder type of valve pin actuator 101, 100 is illustrated, other arrangements may be possible such as lever, screw or solenoid type arrangements. The invention resides in accessing the valve pin bushing through the second plate 113 upon removal of the valve pin actuator 101, 100 and not the specific valve pin actuator assembly selected.

Variations to the above preferred embodiments may be apparent to persons skilled in such structures without departing from the spirit and scope of the present invention which is defined below in the accompanying claims.

The invention claimed is:

1. A valve gated injection molding assembly comprising:
   first and second plates in face to face juxtaposition with a front face of said second plate facing said first plate and defining a manifold cavity therebetween for receiving a melt manifold;
   a nozzle extending through said first plate having a base for contacting said manifold and a tip opposite said base, said nozzle having a passage extending therethrough between said base and said tip;
   a valve pin slidably mounted in said passage, said valve pin having a tip end extending through said nozzle tip to open and close a melt passage through a gate registering with said nozzle tip, said valve pin further having an actuator end opposite said tip end;
   a valve pin guide bushing extending from said base of said nozzle for receiving and guiding said valve pin for movement along said passage, said valve pin guide bushing removably engaging said base of said nozzle for removal in a direction away from said base toward said second plate;
   a valve pin actuator mounted to said second plate and connected to said actuator end of said valve pin for moving said valve pin along said passage for said opening and closing of said melt outlet;
   said second plate having an actuator access port for removal of said valve pin actuator from a rear face of said second plate opposite said front face;
   said second plate further having a bushing access port for removal of said bushing therethrough absent said actuator, such that said bushing is removable without separating said first plate from said second plate.

2. The injection molding assembly of claim 1 wherein:
   said valve pin bushing extends through said manifold;
   space is provided between said valve pin bushing and said manifold to allow thermal expansion of said manifold without said thermal expansion exerting pressure on said valve pin bushing.

3. The injection molding assembly of claim 2 wherein:
said actuator is a piston slidably mounted in a bore in said second plate and slideable along said bore in response to fluid pressure.

4. The injection molding assembly of claim 3 wherein:
a heat insulator extends between said second plate and said manifold.

5. The injection molding assembly of claim 4 wherein:
said valve pin extends through said insulator.

6. The injection molding assembly of claim 5 wherein:
a retainer extends about said valve pin between said valve pin and said insulator;
said retainer abuts against said valve pin bushing to retain said valve pin bushing against movement away from said nozzle;
said retainer being secured to at least one of said insulator and said manifold; and,
said retainer is removable through said bushing access port.

7. The injection molding assembly of claim 6 wherein:
a gap is provided between said valve pin and said retainer to allow for movement of said retainer radial to said valve pin without applying pressure to said valve pin.

8. The injection molding assembly of claim 7 wherein:
said retainer threadedly engages said insulator.

9. The injection molding system of claim 1, wherein said valve pin guide bushing extends into said base of said nozzle.

10. The injection molding system of claim 1, wherein:
said melt manifold includes a manifold melt passage in communication with an inlet of said nozzle which is in communication with said nozzle passage;
said nozzle and said bushing are aligned along a common longitudinal axis;
said manifold melt passage exiting said manifold before communicating with said nozzle inlet; and
said nozzle inlet is in direct fluid communication with said manifold melt passage and is radially offset from said common longitudinal axis.

11. The injection molding assembly of claim 10, wherein:
said nozzle inlet includes a first end and a second end;
said manifold melt passage directly communicating with said first end of said nozzle inlet; and
said second end of said nozzle inlet directly communication with a passage in said bushing, which communicates with said nozzle passage.

12. A valve gated injection molding assembly comprising:
first and second plates in face to face juxtaposition with a front face of said second plate facing said first plate and defining a manifold cavity therebetween for receiving a melt manifold;
a nozzle extending through said first plate having a base for contacting said manifold and a tip opposite said base, said nozzle having a passage extending therethrough between said base and said tip;
a valve pin slidably mounted in said passage, said valve pin having a tip end extending through said nozzle tip to open and close a melt passage through a gate registering with said nozzle tip, said valve pin further having an actuator end opposite said tip end;
a valve pin guide bushing extending from said base of said nozzle for receiving and guiding said valve pin for movement along said passage, said valve pin guide bushing removably engaging said base of said nozzle for removal in a direction away from said base toward said second plate, and said valve pin bushing extending through said manifold, wherein space is provided between said valve pin bushing and said manifold to allow thermal expansion of said manifold without said thermal expansion exerting pressure on said valve pin bushing;
a valve pin actuator mounted to said second plate and connected to said actuator end of said valve pin for moving said valve pin along said passage for said opening and closing of said melt outlet;
said second plate having an actuator access port for removal of said valve pin actuator from a rear face of said second plate opposite said front face; and
said second plate further having a bushing access port for removal of said bushing therethrough absent said actuator, such that said bushing is removable without separating said first plate from said second plate.

13. The injection molding assembly of claim 12, wherein:
said nozzle includes an inlet having a first end and a second end;
said melt manifold includes a manifold melt passage in direct communication with said nozzle inlet first end, said melt passage exiting said manifold before communicating with said nozzle inlet first end;
said second end of said nozzle inlet in direct communication with a passage in said bushing, which communicates with said nozzle passage;
said nozzle and said bushing are aligned along a common longitudinal axis; and
said nozzle inlet is radially offset from said common longitudinal axis.

14. The injection molding assembly of claim 2, wherein said space between said bushing and said manifold provides for said manifold to be spaced apart from said bushing.

* * * * *